R. S. JENNINGS.

ENVELOPE.

No. 6,820. Reissued Dec. 21, 1875.

WITNESSES.

G. E. Upham.

D. D. Kraner

INVENTOR.

R. S. Jennings.

Chipman & Osmun & Co.,

Attys.

N. PETERS, PHOTO-LITHOGRAPHER, WASHINGTON, D. C.

UNITED STATES PATENT OFFICE.

RALPH S. JENNINGS, OF PHILADELPHIA, PENNSYLVANIA, ASSIGNOR TO HIMSELF AND NORMAN G. KELLOGG.

IMPROVEMENT IN ENVELOPES.

Specification forming part of Letters Patent No. 64,879, dated May 21, 1867; reissue No. 6,820, dated December 21, 1875; application filed March 18, 1872.

*To all whom it may concern:*

Be it known that I, RALPH S. JENNINGS, of Philadelphia, in the county of Philadelphia and State of Pennsylvania, have invented a new and valuable Improvement in Envelopes; and I do hereby declare that the following is a full, clear, and exact description of the construction and operation of the same, reference being had to the annexed drawings, making a part of this specification, and to the letters and figures of reference marked thereon.

Figure 1:
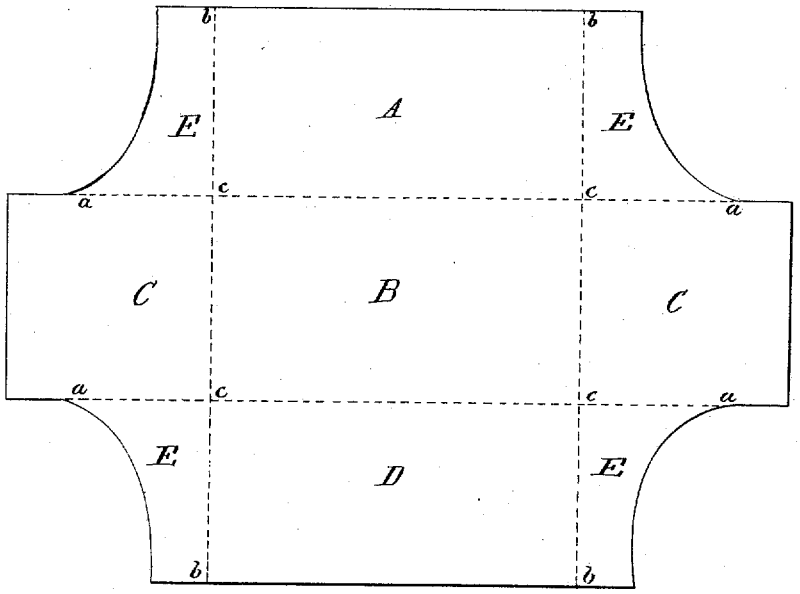
Figure 2:
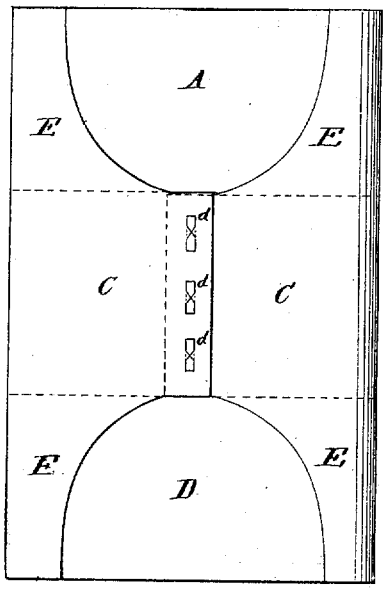
Figure 3:
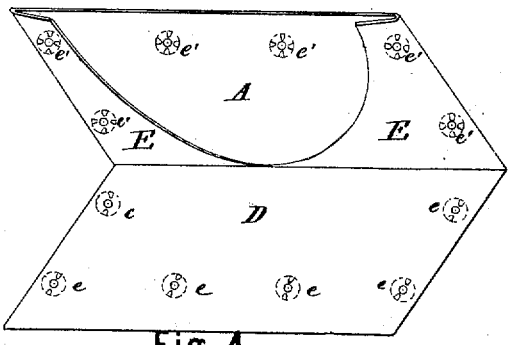

Figure 1 of the drawings is a representation of a plan view of the pattern of my improved envelope. Fig. 2 is a view of the same when partly folded and put together. Fig. 3 is a view of the same when complete, ready for use; and Fig. 4 is a closed envelope.

This invention relates to improvements in the construction of flat envelopes, which are more particularly designed to be used for transmitting money and valuable documents, safely by express and the mails; and consists in cutting the pattern and forming the envelope in such a manner that the corners or ends under the top and bottom flaps are closed by wings or counterfolds thereof, which are united with, and form continuous parts of, the central flaps, which make one side of the envelope. The corner wings prevent the introduction of a wire or other instrument into an envelope for the purpose of abstracting the contents without destroying the envelope; and the union of the central flaps with metal rivets is for the purpose of dispensing with gum and paste entirely in the construction of the envelope.

Fig. 1 represents a pattern of my improved envelope as cut out of paper or other material, the parts forming the sides and flaps being marked off and distinguished by dotted lines *a a*, running longitudinally, and *b b*, transversely, which lines *a a* and *b b* are the creases or folds, made in the ordinary manner, for uniting the several parts of the envelope, of which A is the flap, which is left free when the envelope is made; B, the back; C C, central flaps, which are folded over and united with laps at their ends, as shown in Fig. 2; and D is the bottom flap, which is folded over upon and fastened to the central flaps C C. The creases or traversing lines of folding *b b* are made a short distance within the corner ends of the flaps A D, intersecting the lines *a a* at *c c*, so as to form corner wings E E outside of the lines *a c b*, at each end of the envelope, when it is folded and formed as shown in the figures of the drawing. The central folds C C overlap each other, and are fastened together by the metal spurs *d d*, which pierce through them from the inside, and are clinched on the outside, as shown in Fig. 2. The lower flap D is fastened down to the central flaps by means of the eyelet-hole seals *e e*, or metallic seals for which Letters Patent were granted to me June 26, 1866.

Figure 4:
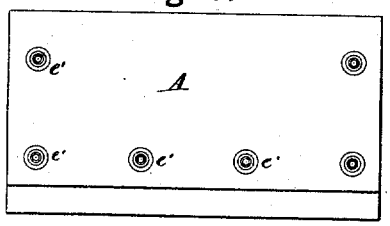

The flap A, when the seals are used, is provided with the caps or heads *e′ e′* of the eyelet-hole seals *e e*, placed in corresponding positions, for the purpose of closing and securing the envelope, as shown in Fig. 4.

What I claim as my invention, and desire to secure by Letters Patent, is—

An envelope having corner wings or extensions E, adapted for folding inward, substantially as and for the purpose specified.

In testimony that I claim the above I have hereunto subscribed my name in the presence of two witnesses.

R. S. JENNINGS.

Attest:

MAYER ULLMAN,

J. W. BLAKE.